July 24, 1956 — L. B. SMITH — 2,755,885
DUST COLLECTOR

Filed Sept. 27, 1954 — 4 Sheets-Sheet 1

INVENTOR.
LLOYD B. SMITH
BY
Jennings & Carter
ATTORNEYS

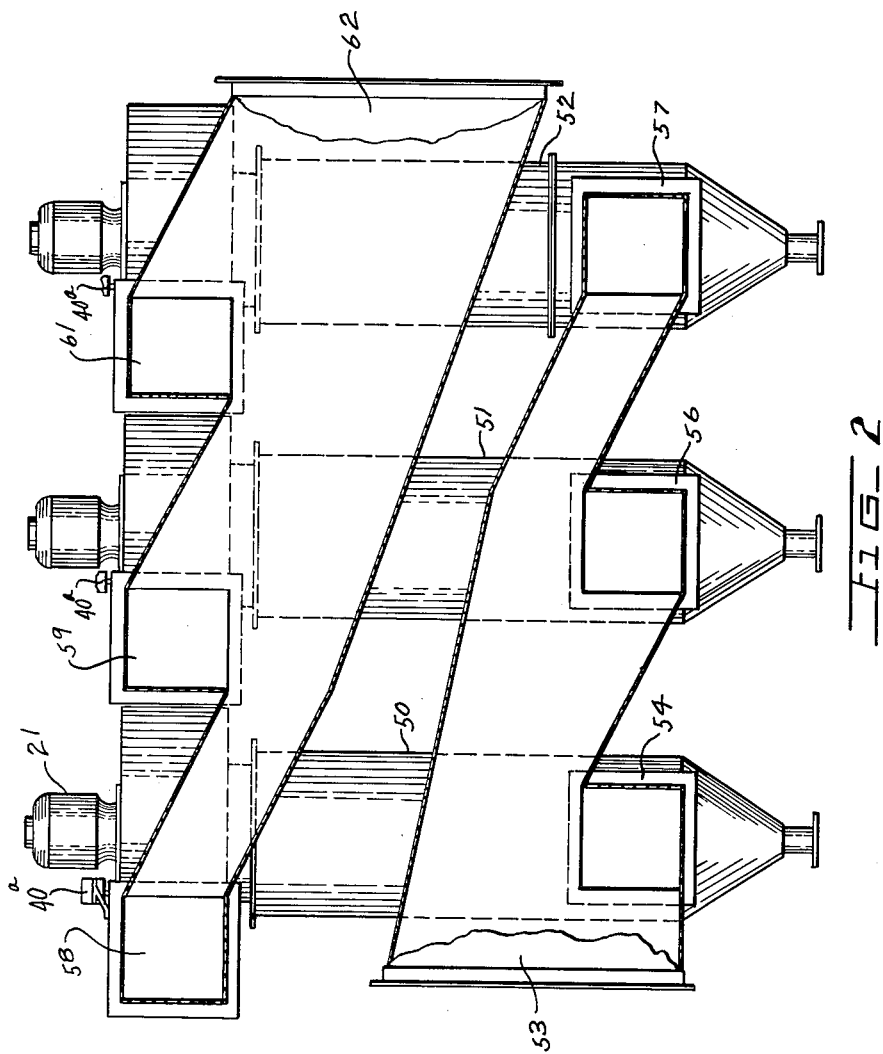

July 24, 1956  L. B. SMITH  2,755,885
DUST COLLECTOR
Filed Sept. 27, 1954  4 Sheets-Sheet 3
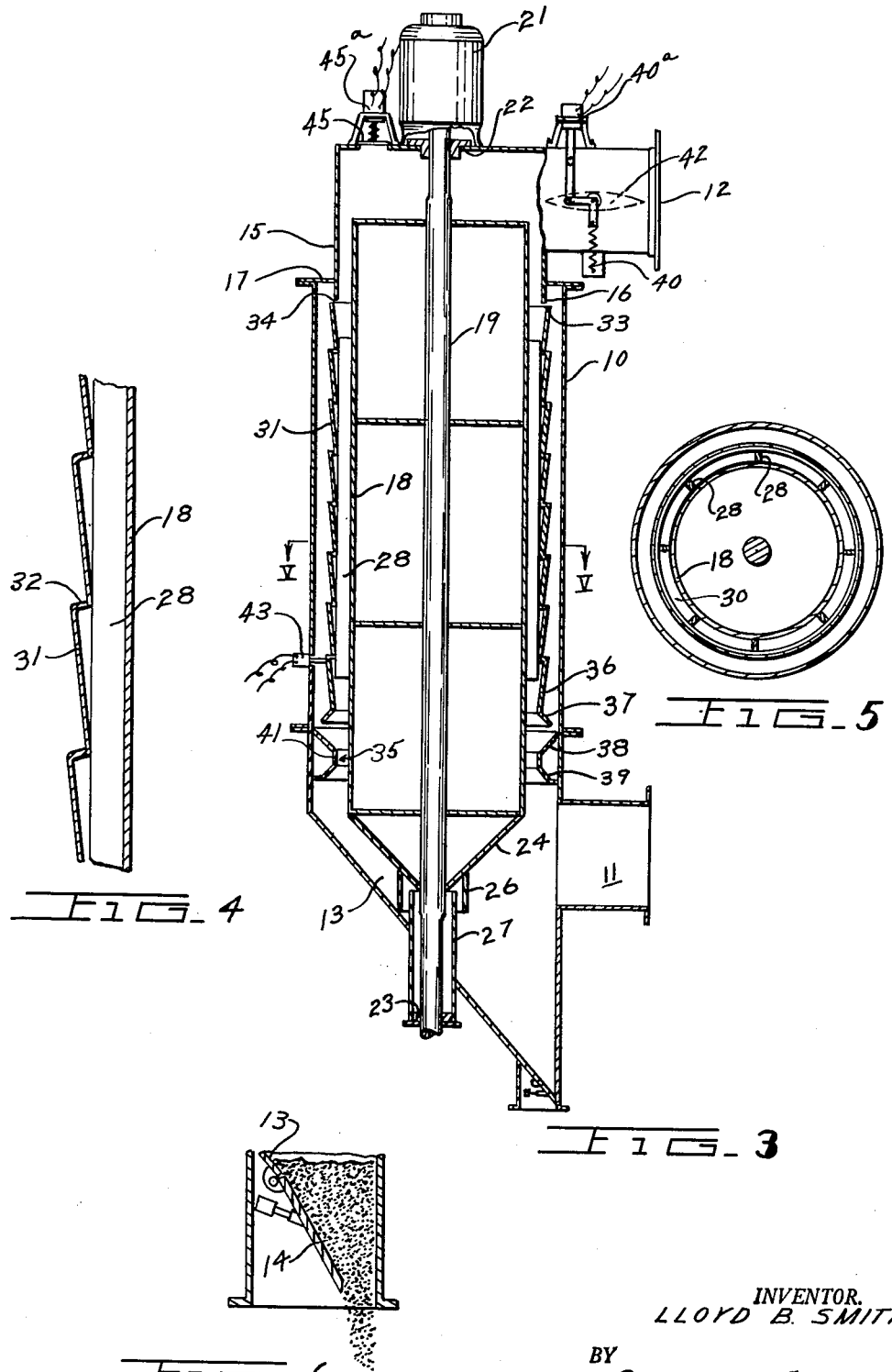

United States Patent Office 2,755,885
Patented July 24, 1956

2,755,885

DUST COLLECTOR

Lloyd B. Smith, Birmingham, Ala.

Application September 27, 1954, Serial No. 458,519

15 Claims. (Cl. 183—76)

This invention relates to dust collectors and has for an object the provision of apparatus for collecting dust from combustion gases and other dust laden gases in which the dust is deposited by centrifugal force into pockets formed about a rotating cylinder and which is stopped periodically for the discharge of collected dust.

One of the objects of my invention is to provide a dust collector embodying a vertically disposed cylindrical housing having a cylindrical rotor mounted therein and with vertical passages around the rotor each having a plurality of dust collecting pockets therein together with means to pass the dust laden gases upwardly through the passages toward an outlet for clean gas in the upper part of the housing.

Another object of my invention is to provide a dust collecter in which the gases to be cleaned are passed through confined paths vertically about a rotating drum and in which pockets are provided in each of said confined paths to receive dust thrown out by centrifugal force, together with means to discharge the collected dust periodically from said passages.

A still further object of my invention is to provide a dust collector in which the dust laden gases are caused to enter vertical passages extending upwardly around a rotating cylinder and in which means are provided to withdraw the outer annulus of the gases at the upper end of the rotating cylinder to cause them to be readmitted into the passages at the lower end thereof.

Briefly, I provide a dust collecting assembly embodying a plurality of vertically disposed cylindrical housings each having an inlet for dust laden gases at the lower end thereof and an outlet for clean gas at the upper end. Dust laden gases are conveyed to the several housings through suitable conduit means and other conduit means are connected to the several outlets. In each of the housings there is mounted a rotating drum having vertical passages about its periphery into which the dust laden gases are admitted and in each of which a plurality of dust collecting pockets is provided in the form of inverted cones. Each of the outlets is provided with a damper, effective when closed, to close off the flow of gases through its associated housing, at which time rotation of the drum is stopped and the dust collected from the gases is discharged from the pockets into a hopper at the bottom of the housing. Means are also provided to close the dampers and stop the rotation of the several drums in sequence, thereby providing a continuously operating dust collecting assembly.

These and other features of my invention are illustrated in the accompanying drawings, forming a part of this application, in which:

Fig. 2 is a sectional view taken along the line II—II of Fig. 1;

Fig. 3 is a vertical sectional view through one of the collectors and taken along the line III—III of Fig. 1;

Fig. 4 is a detail sectional view showing the manner in which each of the inverted conical members is secured to the rotary drum and to adjacent conical members;

Fig. 5 is a sectional view taken along the line V—V of Fig. 3;

Fig. 6 is a detail sectional view of the dust outlet at the bottom of the housing;

Figure 1:
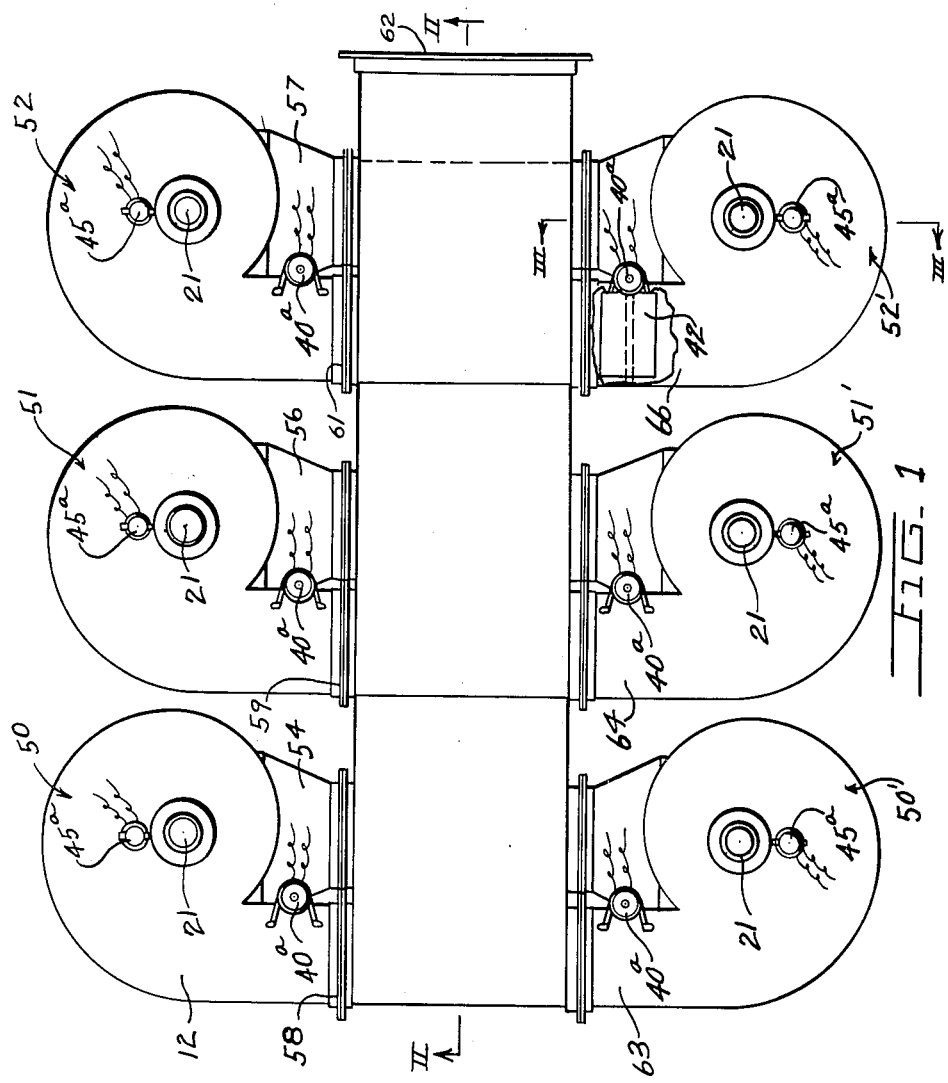
Fig. 1 is a plan view showing a plurality of dust collectors made in accordance with my invention and arranged to operate in parallel.

Referring now to the drawings for a better understanding of my invention and particularly to Figs. 3 to 6 inclusive of the drawings I show one of the units of my dust collecting assembly in which there is an outer or main housing 10 having a gas inlet 11 at the bottom and a gas outlet 12 at the upper end thereof. The outlet 12, as shown in Fig. 1 of the drawing, is preferably scroll, or spiral in shape to reduce resistance to outward flow of the gases as will later appear. The lower end of the housing is provided with a hopper bottom 13 in which the collected dust falls and which may be controlled by a well known form of valve 14 which discharges the collected dust periodically responsive to the weight of the dust collected. The extreme upper end 15 of the housing is smaller in diameter than the main portion thereof as will be seen in Fig. 3, and extends downwardly within the main portion a short distance as shown at 16 for a purpose to be described later. A cover plate 17 closes the annulus between the reduced portion 15 of the housing and the main portion thereof.

Mounted within the housing 10 is an imperforate vertically disposed cylinder 18 which is considerably smaller in diameter than the housing 10 and which is mounted fixedly on a vertically extending shaft 19 driven by a motor 21 on top of the housing. Suitable bearings 22 and 23 are provided in the upper and lower ends of the housing for the shaft 19. The lower end 24 of the drum 18 is conical in shape as shown in Fig. 3 and has a short sleeve 26 extending downwardly therefrom to surround a smaller diameter stationary sleeve 27 mounted in the housing thereby forming a seal to limit the dust from collecting around the bearing 23. The inlet 11, as shown, is substantially directly opposite the conical bottom 24 of the rotary drum 18.

Mounted on the cylinder 18, at regular intervals thereabout, are a plurality of vertically extending radial vanes 28 which may be joined to the drum 18 by welding. As shown in Fig. 3, the vanes 28 extend substantially the length of the cylinder 18. Surrounding the cylinder 18 and the vanes 28, is a plurality of bands 31 in the form of inverted frustums of cones, with their lower edges secured to the vanes 28 as by welding. The upper edge of each of these frusto conical members is bent over as shown at 32 and is welded to the next superjacent frusto conical member, thereby forming an annular pocket surrounding the cylinder 18. The uppermost inverted frusto conical member 33 is open at its upper end and is slightly larger in diameter than the reduced portion 15 of the housing. It extends upwardly to a level just below the lower edge 16 of the reduced diameter portion 15 of the housing 10, thereby providing a narrow annular passage 34 between the lower end of the reduced portion of the housing and the outer wall of the upper inverted cone member. It will thus be seen that the assembly just described provides an impervious outer wall with a plurality of vertically extending passages 30 surrounding the cylinder 18 and with a plurality of dust collecting pockets in each passage, each of these pockets includes an annular shoulder which acts to impede the flow of gas along the outer wall of the cylinder thus establishing a relatively quiet zone in each of said passages along said outer wall formed by said frusto-conical members.

Figure 9:
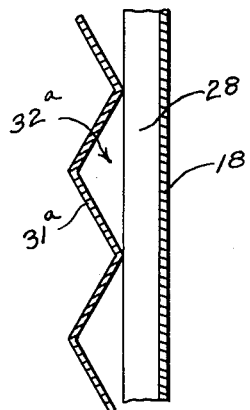
Fig. 9 is a detail sectional view showing a modified form for providing dust collecting pockets in the rotor.

Instead of separate inverted cones 31 I may form the dust collecting pockets by providing a single corrugated metal sheet 31a, as shown in Fig. 9 which surrounds the cylinder 18 and is secured to the vanes 28. As shown the sheet 31a provides a multiplicity of dust collecting pockets 32a.

The lowermost conical member 36 extends somewhat below the lower ends of the vanes 28 and is provided at its lower edge with an outwardly flaring skirt portion 37. Mounted in the housing 10 immediately below the lowermost conical member 36 is a ring member 35 having inwardly converging walls 38 and 39 and a central flat or axially extending portion 41, thereby forming with the drum 18 a constricted passage for directing gases upwardly through the vertical passages 30 surrounding the drum 18. As will be seen from Fig. 3, the ring member 35 just described, in effect, forms a nozzle which increases the velocity and decreases the pressure of the incoming gases at that point, and causes them to travel upwardly through the vertical passages 30. It also thus prevents dust laden gases from passing upwardly around the outside of the conical members.

As shown in Figs. 1 and 3, a damper 42 is provided in the outlet 12 of each separator by means of which the flow of gases through the collector may be interrupted. The damper 42 is normally held in open position by a spring 40 and may be closed by means of an electric solenoid 40a as hereafter described. When the damper 42 is closed and the rotation of the cylinder 18 stopped any dust which may be collected in the pockets formed by the inverted conical members falls by gravity into the hopper bottom 13 of the housing and may be discharged through the weight operated valve 14. In order to shake the collected dust loose, I may provide any well known form of vibrator, indicated diagrammatically at 43, to jar the cylindrical member 18 and thus loosen the dust. Also a purge valve 45, operated by a solenoid 45a, as hereafter described, provides means whereby air at atmospheric pressure may be admitted into the upper end of the housing.

Referring now to Figs. 1 and 2 I show a plurality of collectors such as described in connection with Figs. 3 to 6 inclusive, arranged for operation in parallel. In the example shown three separators 50, 51 and 52 are mounted alongside and opposite three similar separators 50', 51' and 52'. A common conduit 53 is employed to introduce the dust laden gases into the lower ends of the several separators, there being branch conduits 54, 56 and 57 leading from the conduit 53 to the separators 50, 51 and 52, respectively, and similar branch conduits, not shown, leading to the separators 50', 51' and 52'. Conduit 53, as shown in Fig. 2, decreases in cross sectional area from the entrance to the separator 50 to the entrance to the separator 52. Cleaned gases from the separators 50, 51 and 52 are discharged through branch conduits 58, 59 and 61 into a common discharge conduit 62 which increases in cross sectional area from the branch conduit 58 to the branch conduit 61. Similarly, branch conduits 63, 64 and 66 convey the cleaned gases from the separators 50', 51' and 52'.

It is contemplated that in the operation of my improved dust collecting assembly, the flow of gases through the several separators will be interrupted intermittently and sequentially so as to discharge the collected dust from the pockets in the separate collectors. At the time the damper 42 is closed, the motor 21 stops to stop the rotation of the drum 18 and the vibrating apparatus 43 is energized to jar the collected dust loose.

As the dust is jarred loose it falls down into the hopper bottom 13 of the separator. This creates a cloud of dust which rises in the housing and, unless disposed of, would contaminate clean gas from the separator when it resumes operation. In order to overcome this difficulty I provide the purge valve 45 which is opened while the damper 42 is still closed and after the drum 18 is again operating at full speed. Inasmuch as the separators operate at subatmospheric pressure, opening the purge valve 45 admits air at atmospheric pressure into the upper end of the housing and forces any dust laden air remaining in the upper end back down around the cylinder 18.

Figure 8:
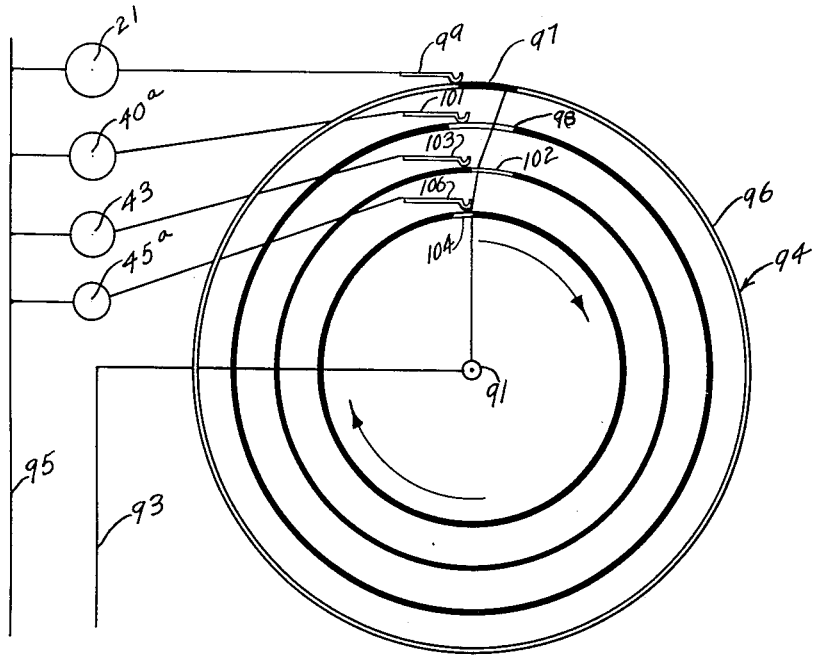
Fig. 8 is a detail view of one of the timing disks shown in Fig. 7.
Figure 7:
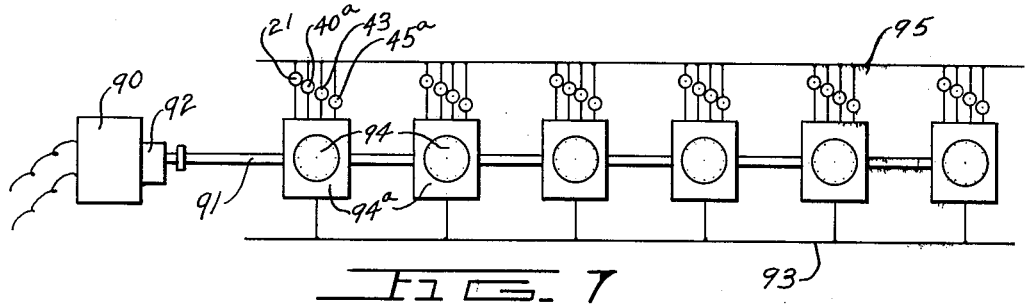
Fig. 7 is a diagrammatic view illustrating one means by which the several separators shown in Fig. 1 may be operated intermittently and in sequence.

While any well known means may be employed to effect the sequential and intermittent shutting down of the separate collectors and the discharge of dust therefrom, I show diagrammatically, by way of example, one means by which this may be accomplished, in Figs. 7 and 8. The mechanism may comprise a clock, or motor 90 having a constant rate of rotation which drives a shaft 91 through suitable reduction gears 92. Shaft 91 is electrically connected to one side 93 of an electric circuit. Driven by the shaft 91 is a plurality of disks 94, mounted in suitable cabinets 94a, one for each separating unit. Each of the disks 94 bears a strip of conducting material 96 thereon as shown in Fig. 8 which is electrically connected to the shaft 91 as shown. The conducting strip 96 is interrupted at 97 for a short distance and a short conducting strip 98 is placed alongside. Other short conducting strips 102 and 104 are also provided on the disk. As the shaft 91 is rotated in the direction shown by the arrow, the conducting strips 96 and 98 on each disk engage, sequentially, contacts 99 and 101, and complete circuits through the separate motors 21 for the separators and the solenoids 40a for closing the dampers 42 of the several separators and back to conductor 95 on the other side of the circuit. At the same time, as each motor 40a is energized to close a damper 42, a circuit through the vibrator 43 may be completed from conducting strip 102 and contact 103 back to conductor 95, to discharge the rust accumulated in the pockets. As the disk continues its rotation the motor 21 is again energized. As the motor attains speed a circuit is completed through purge valve solenoid 45a from conductor 93, short contact strip 104, contact 106 and thence back to conductor 95. This opens purge valve 45 and admits clean air into the upper end of the housing. After the conducting strip 104 leaves the contact 106, permitting the purge valve 45 to close, the conducting strip 98 leaves the contact 101 thus de-energizing the damper solenoid 40a which is then opened by the spring 40, thus permitting the gases to flow again through the separator. It will be understood that the several disks 94 will be so mounted on the shaft 91 relative to each other that the operation of the separating units is interrupted sequentially in any suitable sequence. It is contemplated that five units are to be in operation at all times, while the dust accumulated in the remaining unit is being discharged.

From the foregoing description, the operation of my improved apparatus will be understood. Dust laden gases are admitted into the housing 10 through the inlet 11 around the conical bottom of the cylinder 18 which is rotating at a relatively high rate of velocity, say around 1800 revolutions per minute. The gases pass upwardly through the annular restricted passage formed by the ring 41 and into the vertically extending passages surrounding the drum 18 and formed by the vanes 28 and conical members 31. As the gases move upwardly through the vertical passages they are rapidly rotated by means of the cylinder 18 with its vanes 28 so that any solid matter contained in the gases is forced outwardly by centrifugal force into the relatively quiet zone along the outer wall and is deposited in the pockets formed by the frusto conical members. When the gases reach the upper end of the vertical passages around the cylinder 18, the outer annulus of the gases which contains any remaining dust passes out through the annular passage 34 formed between the uppermost conical member 33 and the depending portion 16 of the upper end of the housing, from whence it passes downwardly around the drum 18 and enters the lower end of the vertical passages, the downward flow being induced by the reduced pressure and high velocity of the gases entering the lower end of the passage formed adjacent the lowermost conical member 36. After a predetermined period of operation, giving time for the dust collecting pockets to fill up, the motor 21 is stopped, the damper 42 is closed, and the vibrator 43 is put in motion, as already described, whereupon the dust collected in the pockets falls downwardly into the hopper bottom 13 of the housing and is discharged through the weighted door 14. Following this, the motor 21 is again energized and brought up to speed as described and with the damper 42 closed, the purge valve 45 is opened admitting clean air at atmospheric pressure into the upper end 15 of the housing and forcing any dust laden air in the upper end back around the cylinder 18. The purge valve 45 is then closed, the damper 42 is opened, and the gases again flow through the separator to be cleaned. With a plurality of separators mounted to form a separating assembly, as shown in Figs. 1 and 2, the operation just described is performed in sequence by the several separators. I have found in actual operation that my improved separating apparatus is highly efficient, being capable of removing close to 100% of the dust contained in dust laden gases. It consumes very little power and imposes a minimum of impedance to the flow of gas therethrough. In actual practice, I have found that the draft loss through my improved apparatus is not more than ½ to ¾ inch, water gauge.

From the foregoing, it will be apparent that I have devised an improved apparatus for separating dust from dust laden gases, which is simple of design, economical of manufacture, and highly efficient in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a dust collector, a vertically disposed cylindrical housing having an inlet for dust laden gases at one end and an outlet for cleaned gas at the other end, a vertically disposed rotary cylinder mounted in the housing, an impervious outer wall joined to and surrounding the rotary cylinder in spaced relation thereto, vanes interposed between the rotary cylinder and the outer wall forming vertical passages therebetween, means to rotate the cylinder at a velocity to cause dust to be deposited in said passages along the outer wall, means to entrap the dust so deposited in said vertical passages, and means to discharge the dust so collected from the housing.

2. In a dust collector, a vertically disposed cylindrical housing having an inlet for dust laden gases at the lower end and an outlet for cleaned gas at the upper end, a vertically disposed rotary cylinder mounted in the housing, an impervious outer wall joined to and surrounding the rotary cylinder in spaced relation thereto, means interposed between the rotary cylinder and the outer wall forming a plurality of vertical passages therebetween extending the major portion of the length of the cylinder, means to direct the dust laden gases from the inlet into the vertical passages, means to impede the axial flow of gases along the outer wall in said vertical passages, means to rotate the cylinder at a velocity to cause dust to be deposited on the outer wall in said passages, means to withdraw the outer annulus of gases from the upper end of said passages and readmit them into the lower end thereof, and means to discharge periodically the dust collected in said passages.

3. In a centrifugal dust collector, a cylindrical vertically disposed housing having an inlet for dust laden gases at the lower end thereof and an outlet at the upper end, a vertically disposed cylindrical rotor mounted in the housing, an imperforate wall joined to and surrounding the rotor in spaced relation thereto and having dust collecting pockets therein, means forming vertical passages between the rotor and said wall, nozzle means in the lower end of the housing effective to increase the velocity and reduce the pressure of the dust laden gases and direct them into the lower ends of said passages, means to withdraw the outer annulus of gases from the upper ends of said passages and readmit them into the lower end, means to rotate the rotor at a velocity to cause dust to be deposited in said pockets and means to discharge periodically the dust collected in said pockets.

4. Apparatus as defined in claim 3 in which the rotor with its imperforate wall is smaller in diameter than the surrounding housing and wherein the upper end of the housing immediately above the upper end of the rotor is reduced in diameter to less than that of the upper end of the imperforate wall and extends downwardly to a level directly above the upper end of said imperforate wall whereby to form therewith a narrow annular passage for the outer annulus of gases to be withdrawn therefrom and to flow downwardly around the outside of the wall to be readmitted into the vertical passages at the bottom.

5. In a centrifugal dust collector a vertically disposed cylindrical housing, an imperforate vertically disposed cylindrical rotor mounted for rotation in the housing, a plurality of axially disposed vanes mounted around the perimeter of the rotor, a plurality of frusto conical members surrounding the rotor and supported by the vanes, the upper end of each of the intermediate frusto conical members being joined to the next superjacent member and closing the gap therebetween to form an imperforate wall, and to form with the rotor vertical passages with annular dust collecting pockets in said wall, an outwardly flaring skirt portion on the lowermost frusto conical member, means forming a constricted passage between the rotor and the housing immediately below the lowermost frusto conical member, means to admit dust laden gases into the housing below the constricted passage, a gas outlet at the upper end of the housing, and means to discharge periodically the dust collected in the pockets.

6. In a centrifugal dust collector a vertically disposed cylindrical housing, an imperforate vertically disposed cylindrical rotor mounted for rotation in the housing, a plurality of axially disposed vanes mounted around the perimeter of the rotor, a plurality of inverted frusto conical members surrounding the rotor and supported by the vanes, the upper end of each of the intermediate frusto conical members being joined to the next superjacent frusto conical member and closing the gap therebetween to form an imperforate wall with dust collecting pockets in said wall, an outwardly flaring skirt portion on the lowermost frusto conical member, means forming a constricted passage between the rotor and the housing immediately below the lowermost frusto conical member, means to admit dust laden gases into the housing below the constricted passage, a tangentially disposed gas outlet at the upper end of the housing, damper means in the housing, a dust outlet in the bottom of the housing, and a valve controlling said dust outlet.

7. Apparatus as defined in claim 5 in which the upper end of the housing is reduced in diameter to slightly less than that of the upper end of the uppermost frusto conical member and extends downwardly in the larger diameter portion to a level immediately above the uppermost frusto conical member whereby to form therewith a narrow annulus for the passage of a part of the gases which move downwardly around the rotor and are readmitted into the vertical passages at the bottom thereof.

8. Apparatus as defined in claim 6 in which means are provided to jar the rotor to loosen dust from the pockets when the damper means are closed.

9. In a dust collecting assembly, a plurality of vertically disposed cylindrical housings each having an inlet for dust laden gases in the lower end thereof and an outlet for cleaned gas at the upper end, conduit means for conveying gases to said inlets and other conduit means connected to said outlets, a vertically disposed rotary cylinder in each housing, means carried by each rotary cylinder defining therewith vertical passages surrounding the cylinder and extending the major portion of the length of each cylinder, means forming a multiplicity of dust collecting pockets in each of said passages, means to direct the dust laden gases from each of the inlets into said vertical passages, a damper in each outlet effective when closed to stop the flow of gases through its associated housing, a dust outlet in the bottom of each housing, and means to close the dampers and stop rotation of the cylinders selectively.

10. In a dust collecting assembly, a plurality of vertically disposed cylindrical housings each having an inlet for dust laden gases in the lower end thereof and an outlet for cleaned gas at the upper end, common conduit means for conveying gases to said inlets and other common conduit means connected to said outlets, a vertically disposed rotary cylinder in each housing, means carried by each rotary cylinder defining therewith vertical passages surrounding the cylinder and extending the major portion of the length of each cylinder, means forming a multiplicity of dust collecting pockets in each of said passages, means to direct the dust laden gases from each of the inlets into said vertical passages, a damper in each outlet effective when closed to stop the flow of gases through its associated housing, a dust outlet in the bottom of each housing, valve controlled means for the dust outlet, and means to close and open the dampers and to stop and start rotation of the associated cylinders in sequence.

11. In a dust collector a vertically disposed cylindrical housing having an inlet for dust laden gases at the lower end and an outlet for cleaned gas at the upper end, a vertically disposed rotary cylinder mounted in the housing, an imperforate wall surrounding the cylinder in spaced relation thereto, vanes interposed between the cylinder and the wall defining therewith vertical passages surrounding the cylinder and extending the major portion of the length of the cylinder, means forming a multiplicity of dust collecting pockets in said passages, means to direct the dust laden gases from the inlet into the vertical passages, means to withdraw the outer annulus of gases from the upper end of said passages and readmit them into the lower end thereof, and means to close off passage of dust laden gases through the housing and concomitantly therewith to vibrate the rotary cylinder and loosen the collected dust permitting it to fall down in the housing and be discharged.

12. In a dust collector, a vertically disposed cylindrical housing having an inlet for dust laden gases at the lower end and an outlet for cleaned gas at the upper end, a vertically disposed rotary cylinder mounted in the housing, an imperforate wall surrounding the cylinder in spaced relation thereto, means defining vertical passages between the cylinder and the imperforate wall and extending the major portion of the length of the cylinder, baffle means in said passages to impede the axial flow of gases therethrough, means to direct the dust laden gases from the inlet into the vertical passages, means to withdraw the outer annulus of gases from the upper end of said passages and readmit them into the lower end thereof, means to close off passage of dust laden gases through the housing and concomitantly therewith to vibrate the rotary cylinder and loosen the collected dust permitting it to fall down in the housing and be discharged, a purge valve in the upper end of the housing disposed when open to admit air into the upper end of the housing, and means operable immediately subsequent to vibrating the rotary cylinder to open the purge valve.

13. In a dust collector, a vertically disposed cylindrical housing having an inlet for dust laden gases at the lower end and an outlet for cleaned gas at the upper end, a vertically disposed rotary cylinder mounted in the housing, means carried by the rotary cylinder defining therewith vertical passages surrounding the cylinder and extending the major portion of the length of the cylinder, means forming a multiplicity of dust collecting pockets in said passages, means to direct the dust laden gases from the inlet into the vertical passages, means to withdraw the outer annulus of gases from the upper end of said passages and readmit them into the lower end thereof, a purge valve in the upper end of the housing disposed when open to admit air into the upper end of the housing, a damper in the outlet effective when closed to stop the flow of dust laden gas through the housing, a vibrator for the rotary cylinder, separate motor means for actuating the rotary cylinder, the damper, the vibrator and the purge valve, and control means operable responsive to the passage of time for starting and stopping the said motor means at predetermined intervals.

14. Apparatus comprising a plurality of dust collectors as defined in claim 13 in which the means operable responsive to the passage of time is effective to start the motor means associated with the several dust collectors in predetermined sequence.

15. In a dust collector, a vertically disposed cylindrical housing having an inlet for dust laden gases at one end thereof and an outlet for cleaned gas at the other end, a vertically disposed rotary cylinder mounted in the housing, an impervious outer wall joined to and surrounding the rotary cylinder in spaced relation thereto, vanes interposed between the rotary cylinder and the outer wall forming vertical passages therebetween, means to direct the dust laden gases from the inlet into the vertical passages, means to rotate the cylinder at a velocity to cause dust to be deposited in said passages along the outer wall, means to entrap the dust so deposited in said passages, means to withdraw the outer annulus of gases in said passages adjacent the outlet end and readmit them thereinto adjacent the inlet end, and means to discharge periodically the dust collected in said passages.

References Cited in the file of this patent

UNITED STATES PATENTS

| 1,810,922 | Mills | June 23, 1931 |
| 1,876,002 | Harper | Sept. 6, 1932 |
| 2,258,901 | Lykken | Oct. 14, 1941 |
| 2,453,593 | Putney | Nov. 9, 1948 |

FOREIGN PATENTS

| 710,366 | Great Britain | June 9, 1954 |
| 256,418 | Germany | Feb. 13, 1913 |
| 331,198 | France | Apr. 14, 1903 |
| 368,731 | Great Britain | Mar. 1, 1932 |